United States Patent
Orzell et al.

(10) Patent No.: US 7,606,743 B2
(45) Date of Patent: Oct. 20, 2009

(54) METHOD FOR IDENTIFYING PRODUCT ASSETS IN A SUPPLY CHAIN USED TO SATISFY MULTIPLE CUSTOMER DEMANDS

(75) Inventors: Robert A. Orzell, Essex Junction, VT (US); Shivakumar P. Patil, Essex Junction, CA (US); Chi-Tai Wang, Greenfield Park, CA (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 10/708,119

(22) Filed: Feb. 10, 2004

(65) Prior Publication Data

US 2005/0177465 A1 Aug. 11, 2005

(51) Int. Cl.
*G06Q 10/00* (2006.01)
*G06F 19/00* (2006.01)

(52) U.S. Cl. .............................. 705/28; 705/22; 705/1; 700/100

(58) Field of Classification Search ........................ None
See application file for complete search history.

(56) References Cited

U.S. PATENT DOCUMENTS

| | | | |
|---|---|---|---|
| 5,548,518 A * | 8/1996 | Dietrich et al. ............. | 700/100 |
| 5,943,484 A | 8/1999 | Milne et al. | |
| 5,971,585 A * | 10/1999 | Dangat et al. ............... | 700/102 |
| 6,088,626 A | 7/2000 | Lilly et al. | |
| 6,119,102 A * | 9/2000 | Rush et al. .................... | 705/29 |
| 6,434,443 B1 * | 8/2002 | Lin ............................ | 700/100 |
| 6,498,786 B1 | 12/2002 | Kirkby et al. | |
| 6,584,370 B2 | 6/2003 | Denton et al. | |
| 6,898,472 B2 | 5/2005 | Crampton et al. | |
| 7,164,959 B2 | 1/2007 | Huang et al. | |
| 2002/0133387 A1 | 9/2002 | Wilson et al. | |
| 2002/0188499 A1 | 12/2002 | Jenkins et al. | |
| 2002/0198757 A1 | 12/2002 | Hegde et al. | |
| 2003/0065415 A1 * | 4/2003 | Hegde et al. ................ | 700/100 |
| 2003/0149631 A1 | 8/2003 | Crampton et al. | |
| 2003/0208392 A1 | 11/2003 | Shekar et al. | |
| 2005/0144056 A1 | 6/2005 | Wang et al. | |

FOREIGN PATENT DOCUMENTS

EP 0 425 405 5/1991

OTHER PUBLICATIONS

Lyon, Peter, "Matching Assets with Demand in Supply-Chain Management at IBM Microelectronics", published in Informs, Journal ISSN:0092-2102, V31, n1, p. 108-124. Downloaded on May 17, 2009 from http://interfaces.journal.informs.org/cgi/reprint/31/1108.pdf.*

(Continued)

*Primary Examiner*—F. Zeender
*Assistant Examiner*—Paul Danneman
(74) *Attorney, Agent, or Firm*—Schmeiser, Olsen & Watts; Michael J. LeStrange

(57) ABSTRACT

A method, a system for practicing the method and a storage device storing the method for identifying product assets in a supply chain used to satisfy customer demands. The method including: receiving a feasible schedule of all components to be assembled into products; receiving customer schedules for delivery of the products; and generating from the feasible schedule, from the customer schedules and from bills of materials listing all components required for a particular product, a set of demand pegging records, the demand pegging records associating a quantity and an availability date of each component of each product with a required quantity of each of the products, each demand pegging record consistent with the feasible schedule.

40 Claims, 14 Drawing Sheets

OTHER PUBLICATIONS

Leachman et al.; IMPReSS: An Automated Production-Planning and Delivery-Quotation System at Harris Corporation-Semiconductor Sector; Interfaces 26:1 Jan.-Feb. 1996; pp. 6-37.

Moodie, Douglas R.; Demand Management: The Evaluation of Price and Due Date Negotiation Strategies Using Simulation; Production and Operations Management, vol. 8, No. 2, Summer 1999; pp. 151-162; Received Mar. 1997; revisions received Oct. 1997 and Sep. 1998; accepted Sep. 1998.

Nemhauser et al.; Integer and Combinatorial Optimization; Copyright © 1999 by John Wiley & Sons, Inc.; pp. 27-41.

Dantzig, George B.; Linear Programming and Extensions; Princeton University Press; Copyright © 1963 by The Rand Corporation; Copyright renewed © 1991; pp. 448-455.

* cited by examiner

| P/N | | LLC |
|---|---|---|
| A | | 1 |
| ↑ | | |
| B | | 2 |
| ↑ | | |
| C ← | | 3 |
| ↑ ┘ | | |
| D (E) | | 4 |

*FIG. 2A*

| P/N | P/N | LLC |
|---|---|---|
| A | | 1 |
| ↑ | | |
| (B | X) | 2 |
| ↑ | ↑ | |
| C | Y | 3 |
| ↑ | ↑ | |
| D | Z | 4 |

*FIG. 2B*

| P/N | P/N | LLC |
|---|---|---|
| A | | 1 |
| ↑ | | |
| (B | X) | 2 |
| ↑ | ↑ | |
| | Y | 3 |
| | ↑ | |
| (C | Z) | 4 |
| ↑ | | |
| D | | 5 |

*FIG. 2C*

EXAMPLE PLANNED INVENTORY REQUISITION FILE

| Part Number | Plant | Requisition Type | Requisition Identifier | Planned Asset Reference | Quantity | Date | Customer Code |
|---|---|---|---|---|---|---|---|
| PN1 | PL1 | CSHP | 500 | | 100 | 2/10/2004 | X |
| PN1 | PL1 | SUB | 5 | PN2 | 200 | 2/20/2004 | |
| PN1 | PL1 | CSHP | 503 | | 300 | 2/28/2004 | X |
| PN2 | PL1 | CSHP | 502 | | 200 | 2/20/2004 | X |
| PN3 | PL1 | CSHP | 600 | | 100 | 3/2/2004 | Y |
| PN6 | PL1 | CSHP | 601 | | 50 | 3/5/2004 | Y |
| PN7 | PL1 | CSHP | 602 | | 30 | 3/8/2004 | Y |
| PN4 | PL1 | COMP | 6 | PN3 | 240 | 2/26/2004 | |
| PN5 | PL1 | COMP | 6 | PN3 | 120 | 2/26/2004 | |
| PN8 | PL1 | COMP | 7 | PN6 | 50 | 3/1/2004 | |
| PN8 | PL1 | COMP | 7 | PN7 | 30 | 3/1/2004 | |

*FIG. 3A*

EXAMPLE CUSTOMER DEMAND FILE

| Part Number | Customer Code | Demand Type | Request Quantity | Request Date | Order Number |
|---|---|---|---|---|---|
| PN1 | X | Order | 50 | 2/5/2004 | 2000 |
| PN1 | X | Order | 50 | 2/10/2004 | 2001 |
| PN1 | X | Order | 300 | 2/28/2004 | 2003 |
| PN2 | X | Order | 200 | 2/20/2004 | 2002 |
| PN3 | Y | Order | 100 | 3/2/2004 | 3002 |
| PN6 | Y | Order | 50 | 3/5/2004 | 3003 |
| PN7 | Y | Order | 30 | 3/8/2004 | 3004 |

*FIG. 3B*

EXAMPLE REQUISITION MAP FILE (AFTER STEP 110)

| Part Number | Plant | Requisition Type | Requisition Identifier | Reference | Requisition Date | Consumption Quantity | Customer P/N | Customer Code | Order Number | Customer Demand Quantity |
|---|---|---|---|---|---|---|---|---|---|---|
| PN1 | PL1 | CSHP | 500 | | 2/10/2004 | 50 | PN1 | X | 2000 | 50 |
| PN1 | PL1 | CSHP | 500 | | 2/10/2004 | 50 | PN1 | X | 2001 | 50 |
| PN1 | PL1 | CSHP | 503 | | 2/28/2004 | 300 | PN1 | X | 2003 | 300 |
| PN2 | PL1 | CSHP | 502 | | 2/20/2004 | 200 | PN2 | X | 2002 | 200 |
| PN3 | PL1 | CSHP | 600 | | 3/2/2004 | 100 | PN3 | Y | 3002 | 100 |
| PN6 | PL1 | CSHP | 601 | | 3/5/2004 | 50 | PN6 | Y | 3003 | 50 |
| PN7 | PL1 | CSHP | 602 | | 3/8/2004 | 30 | PN7 | Y | 3004 | 30 |

*FIG. 3C*

EXAMPLE PLANNED ASSET FILE

| Part Number | PLANT | Asset Type | Asset Identifier | Planned Requisition Reference | Projected Quantity | Projected Date | Start Quantity | Start Date |
|---|---|---|---|---|---|---|---|---|
| PN1 | PL1 | WIP | 1 | | 100 | 2/10/2004 | | |
| PN1 | PL1 | WIP | 2 | | 50 | 2/18/2004 | | |
| PN1 | PL1 | WIP | 3 | | 150 | 2/20/2004 | | |
| PN1 | PL1 | WIP | 4 | | 300 | 2/28/2004 | | |
| PN2 | PL1 | SUB | 5 | PN1 | 200 | 2/20/2004 | | |
| PN3 | PL1 | PL | 6 | | 100 | 3/2/2004 | 120 | 2/26/2004 |
| PN6 | PL1 | PL | 7 | | 50 | 3/5/2004 | 50 | 3/1/2004 |
| PN7 | PL1 | PL | 7 | | 30 | 3/5/2004 | 30 | 3/1/2004 |

FIG. 3D

EXAMPLE COVERAGE 1 and COVERAGE 2 FILE

| Part Number | Plant | Asset Type | Asset Identifier | Requisition Type | Planned Inventory Reference | Requisition Identifier | Quantity | Asset Availability Date | Requisition Date | Start Quantity | Start Date | Coverage File |
|---|---|---|---|---|---|---|---|---|---|---|---|---|
| PN1 | PL1 | WIP | 1 | CSHP | | 500 | 100 | 2/10/2004 | 2/10/2004 | | | 1 |
| PN1 | PL1 | WIP | 2 | SUB | PN2 | 5 | 50 | 2/18/2004 | 2/20/2004 | | | 2 |
| PN1 | PL1 | WIP | 3 | SUB | PN2 | 5 | 150 | 2/20/2004 | 2/20/2004 | | | 2 |
| PN1 | PL1 | WIP | 4 | CSHP | | 503 | 300 | 2/28/2004 | 2/28/2004 | | | 1 |
| PN2 | PL1 | SUB | 5 | CSHP | PN1 | 502 | 200 | 2/20/2004 | 2/20/2004 | | | 1 |
| PN3 | PL1 | PL | 6 | CSHP | | 600 | 100 | 3/2/2004 | 3/2/2004 | 120 | 2/26/2004 | 1 |
| PN6 | PL1 | PL | 7 | CSHP | | 601 | 50 | 3/5/2004 | 3/5/2004 | 50 | 3/1/2004 | 1 |
| PN7 | PL1 | PL | 7 | CSHP | | 602 | 30 | 3/5/2004 | 3/8/2004 | 30 | 3/1/2004 | 1 |

FIG. 3E

EXAMPLE DEMAND PEGGING OUTPUT FILE

| Part Number | Plant | Asset Type | Asset Identifier | Requisition Type | Asset Availability Date | Start Date | Start Quantity | Reference | Requisition Identifier | Quantity | Customer P/N | Customer Code | Order Number | Customer Demand Quantity |
|---|---|---|---|---|---|---|---|---|---|---|---|---|---|---|
| PN1 | PL1 | WIP | 1 | CSHP | 2/10/2004 | N/A | N/A | | 500 | 50 | PN1 | X | 2000 | 50 |
| PN1 | PL1 | WIP | 1 | CSHP | 2/10/2004 | N/A | N/A | | 500 | 50 | PN1 | X | 2001 | 50 |
| PN1 | PL1 | WIP | 4 | CSHP | 2/28/2004 | N/A | N/A | | 503 | 300 | PN1 | X | 2003 | 300 |
| PN1 | PL1 | WIP | 2 | SUB | 2/18/2004 | N/A | N/A | PN2 | 5 | 50 | PN2 | X | 2002 | 50 |
| PN1 | PL1 | WIP | 3 | SUB | 2/20/2004 | N/A | N/A | PN2 | 5 | 150 | PN2 | X | 2002 | 150 |
| PN2 | PL1 | SUB | 5 | CSHP | 2/20/2004 | N/A | N/A | PN1 | 502 | 200 | PN2 | X | 2002 | 200 |
| PN3 | PL1 | PL | 6 | CSHP | 3/2/2004 | 2/26/2004 | 120 | | 600 | 100 | PN3 | Y | 3002 | 100 |
| PN6 | PL1 | PL | 7 | CSHP | 3/5/2004 | 3/1/2004 | 50 | | 601 | 50 | PN6 | Y | 3003 | 50 |
| PN7 | PL1 | PL | 7 | CSHP | 3/5/2004 | 3/1/2004 | 30 | | 602 | 30 | PN7 | Y | 3004 | 30 |

FIG. 3F

EXAMPLE BILL OF MATERIALS FILE

| Part Number | Plant | Process | Component P/N | BOM Quantity | BIN Flag |
|---|---|---|---|---|---|
| PN3 | PL1 | PR1 | PN4 | 2 | N |
| PN3 | PL1 | PR1 | PN5 | 1 | N |
| PN6 | PL1 | PR1 | PN8 | 1 | Y |
| PN7 | PL1 | PR1 | PN8 | 1 | Y |

FIG. 3G

EXAMPLE BINNING FILE

| Part Number | Plant | Process | BINNED P/N | BINNING PERCENTAGE |
|---|---|---|---|---|
| PN8 | PL1 | PR1 | PN6 | 70 |
| PN8 | PL1 | PR1 | PN7 | 30 |

FIG. 3H

EXAMPLE TEMP FILE

| Part Number | Plant | Asset Type | Asset Identifier | Requisition Type | Asset Availability Date | Start Date | Start Quantity | Reference | Requisition Identifier | Quantity | Customer P/N | Customer Code | Order Number |
|---|---|---|---|---|---|---|---|---|---|---|---|---|---|
| PN3 | PL1 | PL | 6 | CSHP | 3/2/2004 | 2/26/2004 | 120 | | 600 | 100 | PN3 | Y | 3002 |
| PN3 | PL1 | PL | 6 | CSHP | 3/2/2004 | 2/26/2004 | 120 | | 600 | 100 | PN3 | Y | 3002 |
| PN6 | PL1 | PL | 7 | CSHP | 3/5/2004 | 3/1/2004 | 50 | | 601 | 50 | PN6 | Y | 3003 |
| PN7 | PL1 | PL | 7 | CSHP | 3/5/2004 | 3/1/2004 | 30 | | 602 | 30 | PN7 | Y | 3004 |

| Customer Demand Quantity | Component P/N | BOM Quantity | BIN FLAG |
|---|---|---|---|
| 100 | PN4 | 2 | N |
| 100 | PN5 | 1 | N |
| 50 | PN8 | 1 | Y |
| 30 | PN8 | 1 | Y |

*FIG. 3I*

EXAMPLE REQUISITION MAP FILE (AFTER STEP 215)

| Part Number | Plant | Requisition Type | Requisition Identifier | Reference | Requisition Date | Consumption Quantity | Customer P/N | Customer Code | Order Number | Customer Demand Quantity |
|---|---|---|---|---|---|---|---|---|---|---|
| PN1 | PL1 | CSHP | 500 | | 2/10/2004 | 50 | PN1 | X | 2000 | 50 |
| PN1 | PL1 | CSHP | 500 | | 2/10/2004 | 50 | PN1 | X | 2001 | 50 |
| PN1 | PL1 | CSHP | 503 | | 2/28/2004 | 300 | PN1 | X | 2003 | 300 |
| PN2 | PL1 | CSHP | 502 | | 2/20/2004 | 200 | PN2 | X | 2002 | 200 |
| PN3 | PL1 | CSHP | 600 | | 3/2/2004 | 100 | PN3 | Y | 3002 | 100 |
| PN6 | PL1 | CSHP | 601 | | 3/5/2004 | 50 | PN6 | Y | 3003 | 50 |
| PN7 | PL1 | CSHP | 602 | | 3/8/2004 | 30 | PN7 | Y | 3004 | 30 |
| PN4 | PL1 | COMP | 6 | PN3 | 2/26/2004 | 240 | PN3 | Y | 3002 | 100 |
| PN5 | PL1 | COMP | 6 | PN3 | 2/26/2004 | 120 | PN3 | Y | 3002 | 100 |
| PN8 | PL1 | COMP | 7 | PN6 | 3/1/2004 | 50 | PN6 | Y | 3003 | 50 |
| PN8 | PL1 | COMP | 7 | PN7 | 3/1/2004 | 30 | PN7 | Y | 3004 | 30 |

*FIG. 3J*

| EXAMPLE REQUISITION MAP FILE (AFTER STEP 230) | | | | | | | | | | |
|---|---|---|---|---|---|---|---|---|---|---|
| Part Number | Plant | Requisition Type | Requisition Identifier | Reference | Requisition Date | Consumption Quantity | Customer P/N | Customer Code | Order Number | Customer Demand Quantity |
| PN1 | PL1 | CSHP | 500 | | 2/10/2004 | 50 | PN1 | X | 2000 | 50 |
| PN1 | PL1 | CSHP | 500 | | 2/20/2004 | 50 | PN1 | X | 2001 | 50 |
| PN1 | PL1 | CSHP | 503 | | 2/28/2004 | 300 | PN1 | X | 2003 | 300 |
| PN2 | PL1 | CSHP | 502 | | 2/20/2004 | 200 | PN2 | X | 2002 | 200 |
| PN3 | PL1 | CSHP | 600 | | 3/2/2004 | 100 | PN3 | Y | 3002 | 100 |
| PN6 | PL1 | CSHP | 601 | | 3/5/2004 | 50 | PN6 | Y | 3003 | 50 |
| PN7 | PL1 | CSHP | 602 | | 3/8/2004 | 30 | PN7 | Y | 3004 | 30 |
| PN4 | PL1 | COMP | 6 | PN3 | 2/26/2004 | 240 | PN3 | Y | 3002 | 100 |
| PN5 | PL1 | COMP | 6 | PN3 | 2/26/2004 | 120 | PN3 | Y | 3002 | 100 |
| PN8 | PL1 | COMP | 7 | PN6 | 3/1/2004 | 50 | PN6 | Y | 3003 | 50 |
| PN8 | PL1 | COMP | 7 | PN7 | 3/1/2004 | 30 | PN7 | Y | 3004 | 30 |
| PN8 | PL1 | COMP | 7 | PN6 | 3/1/2004 | 20 | PN6 | UNUSED | 3003 | 50 |

*FIG. 3K*

| EXAMPLE OF DEMAND PEGGING WITH BINNING INPUT |
| --- |
| PN1 IS PRODUCT WHICH IS BINABLE<br>70% BECOMES BINNED PN2<br>30% BECOMES BINNED PN3 |
| CUSTOMER ORDERS:<br>CUSTOMER ORDER 1, PN2 QUANTITY 50<br>CUSTOMER ORDER 2, PN3 QUANTITY 30 |
| PRODUCTION SCHEDULE RUN<br>WIP LOT 1, COMPONENT DEMAND PN 1 QUANITY 100 |
| DEMAND PEGGING RESULT<br>WIP LOT1 - CUSTOMER ORDER 1, QUANTITY 50<br>WIP LOT1 - CUSTOMER ORDER 2, QUANTITY 30<br>WIP LOT1 - UNUSED, QUANTITY 20 |

*FIG. 5A*

| EXAMPLE OF DEMAND PEGGING WITH BINNING |
| --- |
| STEP 1 = ASSIGN ASSETS<br>A - ASSIGN 50 PIECES TO COMPONENT DEMAND 1<br>  SHIPMENT OF PN2 TO CUSTOMER ORDER 1<br>B - ASSIGN 30 PIECES TO COMPONENT DEMAND 1<br>  SHIPMENT OF PN3 TO CUSTOMER ORDER 2 |
| STEP 2 - CALCULATE ASSET DISTRIBUTION<br>A -100 PN1 COMPONENT DEMAND 1 X 70% = 70 PIECES TO PN2<br>SINCE ONLY 50 WAS ASSIGNED IN STEP 1,<br>  ASSIGN REMAINING 20 TO "UNUSED",<br>  AND CREATE NEW RECORD<br>B -100 PN2 COMPONENT DEMAND 1 X 30% = 30 PIECES TO PN3<br>SINCE THIS AMOUNT WAS ASSIGNED IN STEP 1,<br>  NO FURTHER ACTION NEEDED |

*FIG. 5B*

METHOD FOR IDENTIFYING PRODUCT ASSETS IN A SUPPLY CHAIN USED TO SATISFY MULTIPLE CUSTOMER DEMANDS

CROSS REFERENCE TO RELATED APPLICATIONS

The present application is related to pending U.S. patent application Ser. No. 10/707,978, filed on Jan. 29, 2004, to Denton et al., entitled "A METHOD FOR SUPPLY CHAIN COMPRESSION" having (IBM); U.S. patent application Ser. No. 10/707,974, filed on Jan. 29, 2004, to Denton et al., entitled "METHOD FOR PURCHASE ORDER RESCHEDULING IN A LINEAR PROGRAM" having (IBM); U.S. patent application Ser. No. 10/707,976, filed on Jan. 29, 2004, to Denton et al., entitled "A METHOD FOR OPTIMIZING FOUNDRY CAPACITY" having (IBM); U.S. patent application Ser. No. 10/707,972, filed on Jan. 29, 2004, to Denton et al., entitled "METHOD FOR FAIR SHARING LIMITED RESOURCES BETWEEN MULTIPLE CUSTOMERS" having (IBM); U.S. patent application Ser. No. 10/707,979, filed on Jan. 29, 2004, to Denton et al., entitled "A METHOD FOR CONSIDERING HIERARCHICAL PREEMPTIVE DEMAND PRIORITIES IN A SUPPLY CHAIN OPTIMIZATION MODEL" having (IBM); U.S. patent application Ser. No. 10/707,973, filed on Jan. 29, 2004, to Denton et al., entitled "METHOD FOR SIMULTANEOUSLY CONSIDERING CUSTOMER COMMIT DATES AND CUSTOMER REQUEST DATES" having (IBM); and U.S. patent application Ser. No. 10/707,977, filed on Jan. 29, 2004, to Denton et al., entitled "A METHOD FOR SUPPLY CHAIN DECOMPOSITION" having (IBM). The foregoing applications are assigned to the present assignee, and are all incorporated herein by reference.

BACKGROUND OF INVENTION

1. Field of the Invention

The present invention relates to the field of decision support methods and systems for identifying production assets in complex multi-stage and multi-plant manufacturing system environments in order to track assets needed to fulfill multiple customer demands.

2. Background of the Invention

In modern complex multi-stage and multi-plant manufacturing production facilities such as those used in the semiconductor industry, assignment and tracking of production assets in a supply chain to meet multiple customer demands is not a trivial undertaking and current solutions have serious drawbacks.

In a first example, user inputted rules project asset production using the bill of material (BOM) and inter-plant transfers allowing projection to the final stocking point and then matching the projection to demand. However, accuracy of the system is entirely dependent upon the accuracy of the rules used and often results in mis-matches between projection and actual results.

In a second example, final customer information is embedded within the production-scheduling tools allowing planning and tracking through the BOM cycle. However, in very large enterprises a severe degradation in the performance of the production-scheduling tool results and it is difficult to implement this method when many different types of sub-production planning tools are scattered throughout the supply chain.

Therefore, there is a need for a method and system for generating relationships between supply chain assets in a complex multi-stage, multi-part number, and multi-plant manufacturing environment and multiple customer demands such that the generated relationships are consistent with planned production schedules for the manufacturing environment.

SUMMARY OF INVENTION

A first aspect of the present invention is a method for identifying product assets in a supply chain used to satisfy customer demands, comprising: receiving a feasible schedule of all components to be assembled into products; receiving customer schedules for delivery of the products; and generating from the feasible schedule, from the customer schedules and from bills of materials listing all components required for a particular product, a set of demand pegging records, the demand pegging records associating a quantity and an availability date of each component of each product with a required quantity of each of the products, each demand pegging record consistent with the feasible schedule.

A second aspect of the present invention is a method for identifying product assets in a supply chain used to satisfy customer demands, comprising: (a) mapping a planned inventory requisition file comprising component availability schedules and a customer demand file comprising product shipment schedules for products assembled from components into a requisition map file associating the component availability schedules and the product shipment schedules and including quantities of each component to be used for each product, each component and product having a low-level-code indicating a sequence in which the components are assembled into the products and each product and component having a unique part-number; (b) selecting all records from the requisition map file of components or products having low-level codes equal to a current low-level-code; (c) selecting, from a planned asset file comprising component schedules, records having part numbers equal to the part numbers in the records selected in step (b); (d) selecting, from the planned inventory requisition file, records having part numbers equal to the part numbers in the records selected in step (b); (e) mapping records selected in steps (c) and (d) into a coverage file associating component availability with component requirements for each product; (f) mapping the coverage file and records of corresponding part numbers from the requisition map file into a demand pegging output file comprising demand pegging output records, the demand pegging records associating a quantity and an availability date of each component required to produce a required quantity of each of the products, each demand pegging record consistent with the feasible schedule; (g) generating additional records in the requisition map file for components required to fabricate products whose records were mapped into said demand pegging output file in step (f); and (h) incrementing the current low-level-code and repeating steps (b) through (h) until the current low-level code is higher than a highest low-level-code of any component or product.

A third aspect of the present invention is a computer system comprising a processor, an address/data bus coupled to the processor, and a computer-readable memory unit adapted to be coupled to the processor, the memory unit containing instructions that when executed by the processor implement a method for identifying product assets in a supply chain used to satisfy customer demands, the method comprising the computer implemented steps of: receiving a feasible schedule of all components to be assembled into products; receiving customer schedules for delivery of the products; and generating from the feasible schedule, from the customer schedules and from bills of materials listing all components required for a particular product, a set of demand pegging records, the demand pegging records associating a quantity and an availability date of each component of each product with a required quantity of each of the products, each demand pegging record consistent with the feasible schedule.

A fourth aspect of the present invention is a computer system comprising a processor, an address/data bus coupled to the processor, and a computer-readable memory unit adapted to be coupled to the processor, the memory unit containing instructions that when executed by the processor implement a method for identifying product assets in a supply chain used to satisfy customer demands, the method comprising the computer implemented steps of: (a) mapping a planned inventory requisition file comprising component availability schedules and a customer demand file comprising product shipment schedules for products assembled from components into a requisition map file associating the component availability schedules and the product shipment schedules and including quantities of each component to be used for each product, each component and product having a low-level-code indicating a sequence in which the components are assembled into the products and each product and component having a unique part-number; (b) selecting all records from the requisition map file of components or products having low-level codes equal to a current low-level-code; (c) selecting, from a planned asset file comprising component schedules, records having part numbers equal to the part numbers in the records selected in step (b); (d) selecting, from the planned inventory requisition file, records having part numbers equal to the part numbers in the records selected in step (b); (e) mapping records selected in steps (c) and (d) into a coverage file associating component availability with component requirements for each product; (f) mapping the coverage file and records of corresponding part numbers from the requisition map file into a demand pegging output file comprising demand pegging output records, the demand pegging records associating a quantity and an availability date of each component required to produce a required quantity of each of the products, each demand pegging record consistent with the feasible schedule; (g) generating additional records in said requisition map file for components required to fabricate products whose records were mapped into the demand pegging output file in step (f); and (h) incrementing the current low-level-code and repeating steps (b) through (h) until the current low-level code is higher than a highest low-level-code of any component or product.

A fifth aspect of the present invention is a program storage device readable by machine, tangibly embodying a program of instructions executable by the machine to perform method steps for identifying product assets in a supply chain used to satisfy customer demands the method steps comprising: receiving a feasible schedule of all components to be assembled into products; receiving customer schedules for delivery of the products; and generating from the feasible schedule, from the customer schedules and from bills of materials listing all components required for a particular product, a set of demand pegging records, the demand pegging records associating a quantity and an availability date of each component of each product with a required quantity of each of the products, each demand pegging record consistent with the feasible schedule.

A sixth aspect of the present invention is a program storage device readable by machine, tangibly embodying a program of instructions executable by the machine to perform method steps for identifying product assets in a supply chain used to satisfy customer demands the method steps comprising: (a) mapping a planned inventory requisition file comprising component availability schedules and a customer demand file comprising product shipment schedules for products assembled from components into a requisition map file associating the component availability schedules and the product shipment schedules and including quantities of each component to be used for each product, each component and product having a low-level-code indicating a sequence in which the components are assembled into the products and each product and component having a unique part-number; (b) selecting all records from the requisition map file of components or products having low-level codes equal to a current low-level-code; (c) selecting, from a planned asset file comprising component schedules, records having part numbers equal to the part numbers in the records selected in step (b); (d) selecting, from the planned inventory requisition file, records having part numbers equal to the part numbers in the records selected in step (b); (e) mapping records selected in steps (c) and (d) into a coverage file associating component availability with component requirements for each product; (f) mapping the coverage file and records of corresponding part numbers from the requisition map file into a demand pegging output file comprising demand pegging output records, the demand pegging records associating a quantity and an availability date of each component required to produce a required quantity of each of the products, each demand pegging record consistent with the feasible schedule; (g) generating additional records in said requisition map file for components required to fabricate products whose records were mapped into the demand pegging output file in step (f); and (h) incrementing the current low-level-code and repeating steps (b) through (h) until the current low-level code is higher than a highest low-level-code of any component or product.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIGS. 2A, 2B and 2C illustrate the concept of low-level-codes utilized by the present invention;

FIGS. 3A, 3B, 3C, 3D, 3E, 3F, 3G, 3H, 3I, 3J and 3K are examples of various files used or generated by the present invention;

FIGS. 5A and 5B illustrate demand pegging with binning according to the present invention.

DETAILED DESCRIPTION

A planned asset is defined as an asset having a release date into manufacturing later than a date that a production-scheduling run was performed. A planned asset is an asset that will exist at some time in the future from the current time. Demand pegging is defined as associating planned or actual assets with particular demands for those assets. Assets include all component parts and final parts in a supply chain. A schedule is defined as an availability or delivery date for a stated quantity of a specified asset, component or product herein and in the claims. For example, quantities of component part numbers (P/N)s required to produce a required quantity of a given P/N for shipment to a customer are "reserved" for that purpose. Binning is defined as sorting a single asset into two or more different assets. For example, one P/N (the binable P/N) may be sorted into multiple different P/Ns (binned P/Ns) having different values for one or more different specifications applicable to the binable P/N. Often binned P/Ns can be substituted for one another. For example a higher speed sort part can be substituted for a lower speed sort part. A feasible schedule is defined as a schedule for a supply chain wherein availability or shipment dates of component assets required to produce a final product and to support a shipment date of the final product made from those component assets are consistent with component ship dates and also with product ship dates. A demand pegging schedule is consistent with a feasible schedule by definition when quantities and dates of customer shipments and those dates and quantities in a production-scheduling run (PSR) are identical and the demand pegging file reflects the same sources of components as the PSR. Those sources include but are not limited to multi-sources, substitution sources and manufacturing release sources. A PSR is a feasible plan. Methods and tools for performing PSRs and generating PSR schedules are well known in the art and are often customized for individual production lines.

Figure 1A:
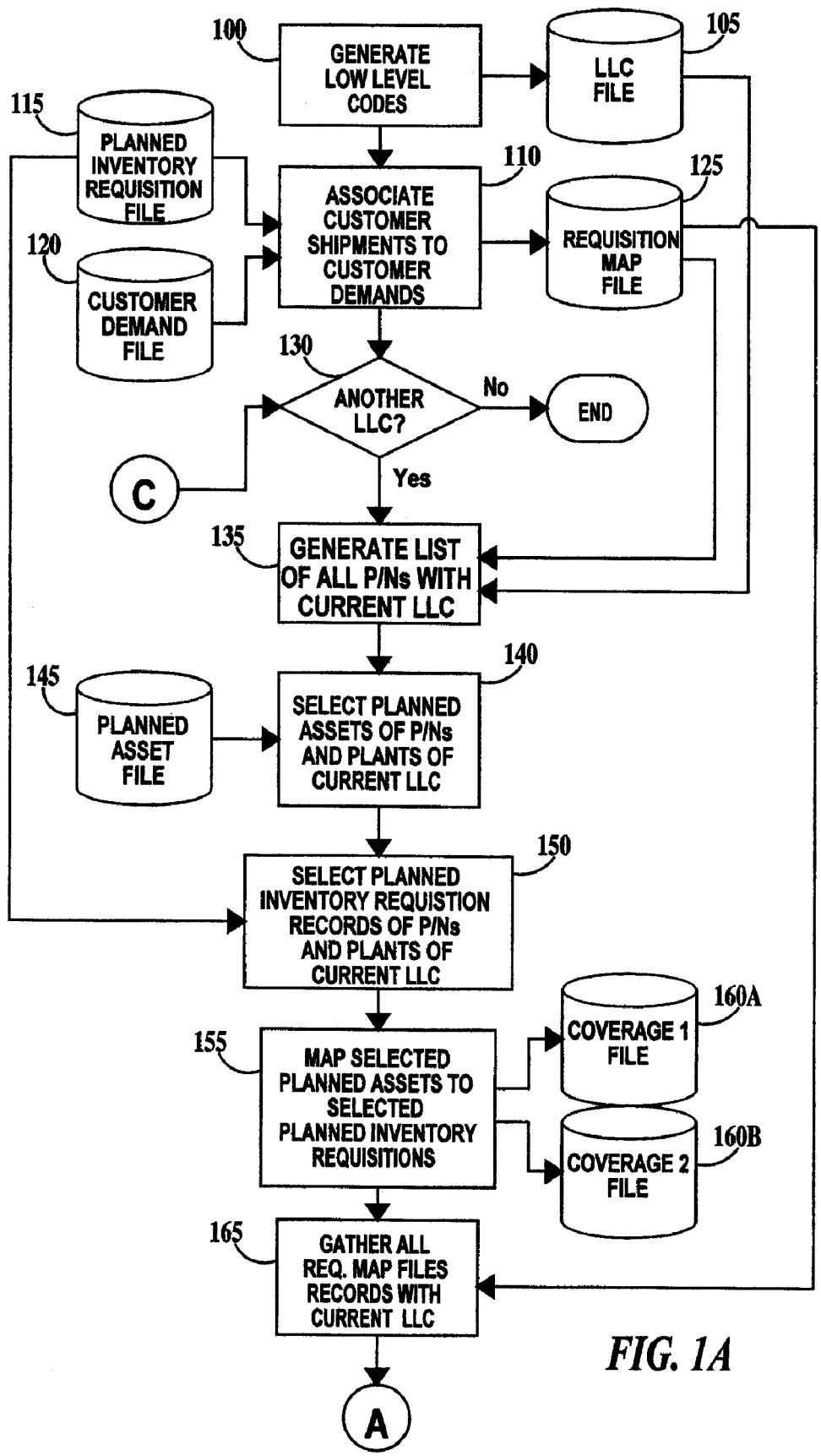
FIGS. 1A, 1B and 1C comprise a single flowchart illustrating the major steps of the method of the present invention.
Figure 1B:
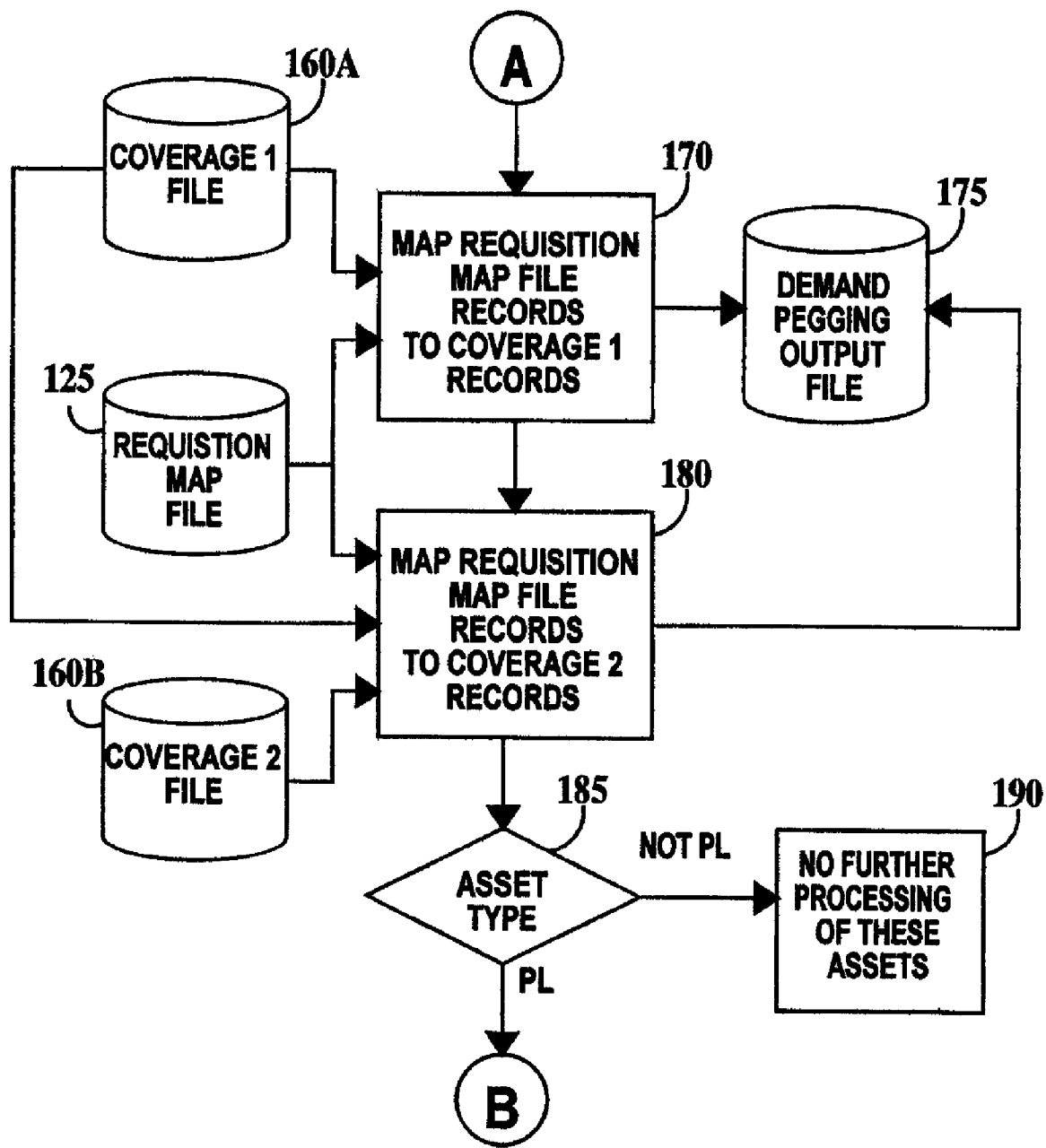
Figure 1C:
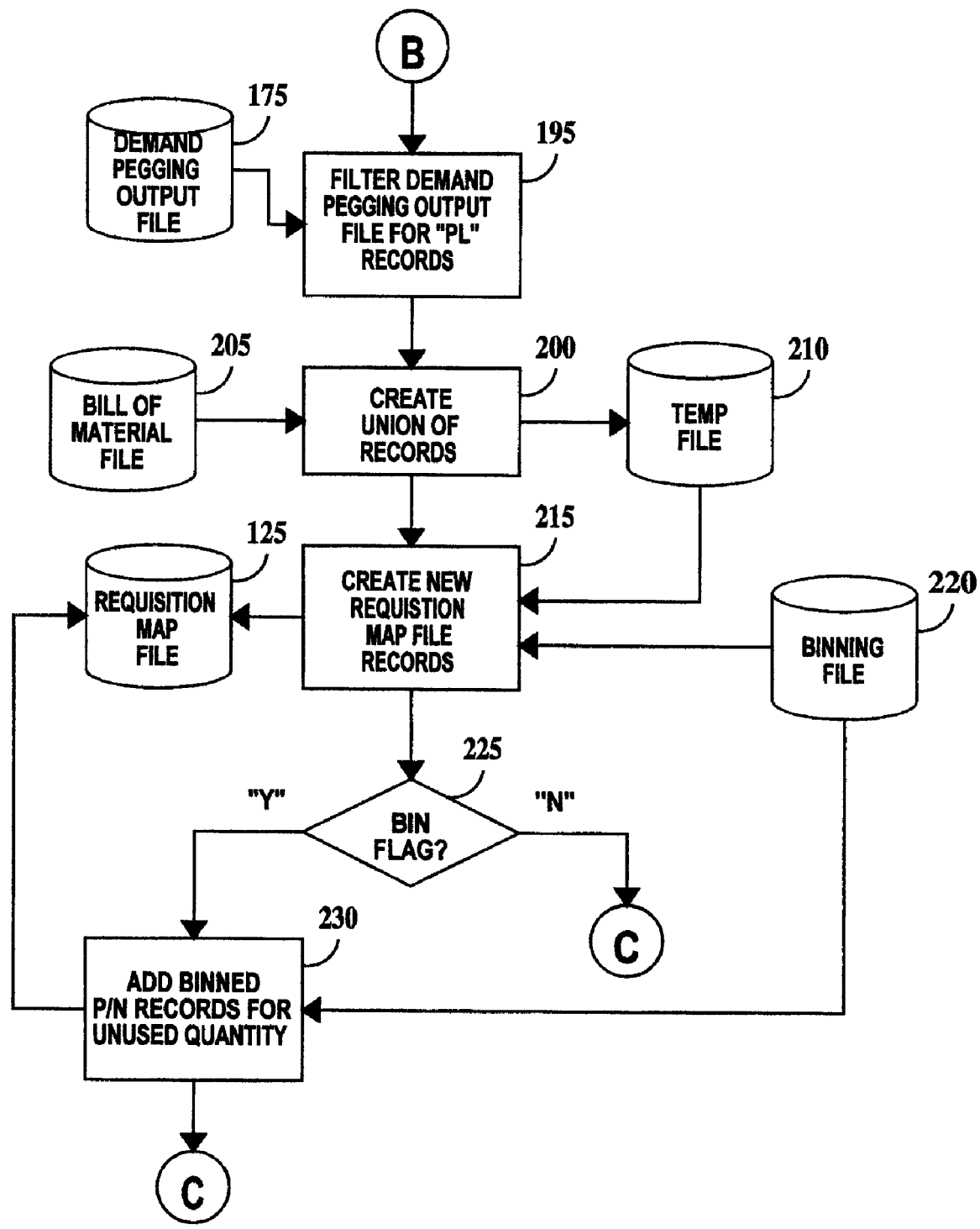

FIGS. 1A, 1B and 1C comprise a single flowchart illustrating the major steps of the method of the present invention. In FIG. 1A, in step 100, low-level-codes (LLC) are generated and written to LLC file 105. LLC file 105 is simply a listing of the P/Ns of all the production assets of the entire supply chain as indicated by the BOM for all products and customers of a production facility and the LLC assigned to each P/N. The production facility may extend across multiple production plants and may include vendors and the P/Ns include components as well as final product shippable to a customer. The LLC indicates a sequence in which parts must be processed based on bill of material. Groups of parts sharing the same LLC may be processed concurrently. The fields of each record and a description of those fields of LLC file 105 are described in Table I infra.

TABLE I

LLC FILE

| | |
|---|---|
| Part Number | A unique product identifier |
| Low-level-code | Low-level-code indicating sequence part numbers should be processed by this invention. |

Turning to FIGS. 2A, 2B and 2C, FIGS. 2A, 2B and 2C illustrate the concept of LLCs utilized by the present invention. In FIG. 2A, P/N C is fabricated using P/N D, P/N B is fabricated using P/N C and P/N A is fabricated using P/N B. PN A is customer shippable product. Thus in the supply chain ABCD, P/N A is assigned an LLC of 1, P/N B an LLC of 2, P/N C an LLC of 3 and P/N D an LLC of 4. When multiple P/Ns are required to fabricate the same P/N, then the multiple P/Ns are assigned the same LLC. For example, if P/N E is also required to fabricate P/N C, then P/N E would be assigned the same LLC as P/N D, namely LLC 4. Generation of LLCs is well known in the art and generation of LLCs for P/Ns having more than one component P/N is taught in U.S. Pat. No. 5,943,484 co-assigned to International Business Machine Corporation, Armonk N.Y., and is hereby incorporated by reference in its entirety.

FIG. 2B illustrates LLCs when two different P/Ns in two different supply chains utilize the same manufacturing resource. In FIG. 2B, supply chain ABCD is the same as in FIG. 2A, but a new supply chain XYZ is introduced. In supply chain XYZ, P/N Y is fabricated using P/N Z and P/N X is fabricated using P/N Y. P/N X is a customer shippable part. P/N X and P/N B share a common manufacturing resource. The LLC generation methods described supra would assign an LLC of 1 to X, 2 to Y and 3 to Z, but this would result in potential conflicts, therefore P/N X must be assigned an LLC of 2, P/N Y an LLC of 3 and P/N Z an LLC of 4. FIG. 2C illustrates the case where additionally P/N C and P/N Z share the same manufacturing resource. In this case P/N A is assigned an LLC of 1, P/Ns B and X an LLC of 2, P/N Y an LLC of 3, P/Ns C and Z an LLC of 4 and P/N D an LLC of 5. Generation of LLCs for P/Ns sharing manufacturing resource is taught in U.S. Pat. No. 6,584,370 co-assigned to International Business Machine Corporation, Armonk N.Y., and is hereby incorporated by reference in its entirety.

The selection of standard LLCs, multiple component LLCs, shared manufacturing resource, or LLCs accounting for both multiple components and shared resources by different P/Ns is determined by the user. Likewise, step 100 of FIG. 1A may be performed externally to the practice of the present invention and LLC file 105 supplied.

Returning to FIG. 1A, in step 110, the customer shipments are associated to customer demands. Step 110 uses information from a planned inventory requisition file 115 generated by a PSR and a customer demand file 120 (which was used to generate the PSR) to generate a requisition map file 125 to establish an association between customer shipments in planned inventory requisition file 115 and customer demand file 120. As described infra, in each LLC loop, requisition map file 125 is updated several times. This association may be a many-to-many relationship as one shipment may cover several demands and several shipments may cover one demand. Each of the output records of this process will contain information on specific customer demands and the particular customer shipments that will satisfy the demand from the PSR. However, a shortcoming of a PSR schedule is the relationship between component P/Ns and the final or customer P/N made from those component P/Ns is not visible.

The fields of each record and a description of those fields of planned inventory requisition file 115, customer demand file 120 and requisition map file 125 are described respectively in tables II, III and IV infra and examples files are illustrated respectively in FIGS. 3A, 3B and 3C.

TABLE II

| | |
|---|---|
| PLANNED INVENTORY REQUISITION FILE | Planned requisitions from inventory for a given P/N at a given manufacturing plant, which are calculated by the production-scheduling run. These requisitions indicate how inventory is consumed and for what purpose. |
| Part Number | A unique product identifier |
| Plant | A location descriptor indicating where inventory will be consumed |

TABLE II-continued

| | |
|---|---|
| Requisition Type | A code indicating the purpose of the requisition. The following are key requisition types:<br>"CSHP" - a requisition of inventory required to make a shipment to a customer.<br>"COMP" - a requisition of component inventory required to support a planned manufacturing release. There will be a matching "PL" entry for the assembly part number with the same requisition identifier in planned asset file 145 discussed infra.<br>"SUB" - a requisition of inventory to use this given part number in place of another part number. There will be a corresponding "SUB" entry for the part number for which this part is substituting in planned asset file 145 discussed infra.<br>"INTSHP" - a requisition to send inventory from this plant to another plant. There will be a corresponding "INTRECPT" entry for the receiving plant in planned asset file 145 discussed infra. |
| Requisition Identifier | A unique code identifying this specific planned inventory requisition. |
| Planned Asset Reference | For a requisition indicating the part will be used as a substitution for another part number, this field will reference the part number for which the substitution is being made.<br>For a requisition indicating the part will be used as an interplant shipment to another plant (not a customer), this field will reference the plant the product is being shipped to.<br>For a requisition indicating the part will be used as a component for an assembly, this field will reference the assembly part number. |
| Quantity | The quantity to be removed from inventory. |
| Date | The date on which the requisition of inventory needs to be performed. |
| Customer Code | A code identifying the customer requesting the product. |
| OTHER | Other fields per user requirements. |

TABLE III

| | |
|---|---|
| CUSTOMER DEMAND FILE | This is a file of customer product shipment schedules. It is common to both the method of the present invention and the production-scheduling run whose output includes Planned Inventory Requisition File 115 which is an input to the present invention. |
| Part Number | A unique product identifier for the product desired by the customer |
| Customer Code | A code identifying the customer requesting the product |
| Demand Type | A code identifying the type of demand. For example, a demand may be a hard committed order or it may be a forecast. |
| Request Quantity | The quantity requested by the customer. |
| Request Date | The date for which the customer is requesting the product. |
| Order Number | A unique identifier associated with this particular demand record. |
| OTHER | There may be many data elements associated with a customer demand which may be carried through for reporting purposes as part of the eventual output of this invention based on user needs. |

TABLE IV

| | |
|---|---|
| REQUISITION MAP FILE | A mapping of planned requisitions from planned inventory requisition file 115 and demands from customer demand file 120. |
| Part Number | A unique product identifier (from planned inventory requisition file 115). |
| Plant | A location descriptor indicating where inventory will be consumed (from planned inventory requisition file 115). |
| Requisition Type | A code indicating the purpose of the requisition (from planned inventory requisition file 115). |
| Requisition Identifier | A unique code identifying this specific planned requisition (from planned inventory requisition file 115). |
| Reference | Corresponding planned asset reference (from planned inventory requisition file 115). |
| Requisition Date | Date inventory for this part number/plant will be consumed (from planned inventory requisition file 115). |
| Consumption Quantity | Portion of requisition that is being tied to the specific customer demand below (calculated). |
| Customer Part Number | The part number associated with the customer order (from customer demand file 120). |
| Customer Code | A code identifying the customer requesting the product (from planned inventory requisition file 115). |

TABLE IV-continued

| | |
|---|---|
| Order Number | A unique identifier associated with this particular demand record (from customer demand file 120). |
| Customer Demand Quantity | Portion of the customer demand quantity covered by the Requisition Type and Identifier (calculated). |
| OTHER | Other fields per user requirements. |

Requisition map file 125 is generated as follows: (1) from planned inventory requisition file 115, for all Requisition Type fields="CSHP" copy fields Part Number, Plant, Requisition Type, Requisition Identifier, Date and Customer Code into corresponding fields of records in requisition map file 125; (2) from customer demand file 120 find all records having Part Number and Customer Code corresponding to those in (1) and copy fields Customer Part Number and Order Number into corresponding fields of records in requisition map file 125; (3) calculate the Consumption Quantity field by disaggregating the Quantity field of planned inventory requisition file 115 against all demands for each P/N; and (4) calculate the Customer Demand Quantity field by disaggregating the Request Quantity field of customer demand file 120.

For example, the Quantity field of the first record of the Example Planned Inventory Requisition File of FIG. 3A is 100 (of PN1) and disaggregates into the first record Consumption Quantity of 50 (of PN1) and the second record Consumption Quantity of 50 (of PN1) of the Example Requisition Map File of FIG. 3C. The Quantity field of the third record of the Example Planned Inventory Requisition File of FIG. 3A is 300 (of PN1) and disaggregates into the third record Consumption Quantity of 300 (of PN1) of the Example Requisition Map File of FIG. 3C. There are various methods for disaggregating known to those of ordinary skill in the art. Step 110 essentially initializes requisition map file 125 for the first pass through the LLC loop as described infra.

Returning to FIG. 1A, in step 130 the first time though, the lowest numerical, for example 1, LLC is chosen. In subsequent iterations the next higher (numerically) LLC is chosen, for example 2 or higher. If all LLCs have been chosen the method is complete and processing terminates. In step 135, a list of all P/Ns that exist in records in the current version of requisition map file 125 assigned to the current LLC are selected and held in memory or in a temporary file. Then, in step 140, records from a planned asset file 145 having P/Ns and Plants the same as the P/Ns and Plants that exist in the records selected from the current version of requisition map file 125 are selected. Planned asset file 145 is generated from the PSR described supra. The fields of each record and a description of those fields of planned asset file 145 is described in table V infra and an example file is illustrated in FIG. 3D.

TABLE V

| | |
|---|---|
| PLANNED ASSET FILE | These are either actual production assets such as inventory and work-in-process for a given part number or future planned assets which will be created as recommended by the production-scheduling run by either through receipt of products from other plants or from releasing new work-in-process into the manufacturing line. |
| Part Number | A unique product identifier. |
| Plant | A location descriptor indicating where inventory will be created. |
| Asset Type | A code indicating the form of the present or planned asset. The following are our key asset types:<br>"INV" - current available inventory.<br>"WIP" - work-in-process in the manufacturing line for the given part number and plant which is projected to become inventory at a future date.<br>"PL" - a planned manufacturing release. This is a planned release of material into the manufacturing line at a future date, which will become "WIP." If this planned release requires component parts, there will be corresponding entries for the component parts as "COMP" entries in planned inventory requisition file 115.<br>"SUB" - a planned receipt of a part number, which can be used in place of the part number associated with this asset. The part number that is being used to substitute for the part number on this asset will have a corresponding "SUB" entry in the planned inventory requisition file described above.<br>"INTRECPT" - a planned receipt of the part number from another location. There will be a corresponding "INTSHP" entry on the sending plant in planned inventory requisition file 115. |
| Asset Identifier | A unique identifier identifying this particular actual or planned asset. |
| Planned Inventory Requisition Reference | For an Asset Type representing that another part number will be used to substitute for the given part number, this field will reference the part number that is being used for the substitution. For an Asset Type representing a receipt of the part number from another plant, this field will indicate the plant that is shipping the part. |
| Projected Quantity | Quantity that is projected to be placed in inventory corresponding to this asset. |
| Projected Date | Date on which the asset is planned to be available in inventory (i.e., consumable by a planned inventory requisition). |

TABLE V-continued

| | |
|---|---|
| Start Quantity | For a "PL" Asset Type (i.e., planned manufacturing release), the quantity of product that is planned for introduction into manufacturing. This differs from Projected Quantity as yield loss may occur during processing. |
| Start Date | For a "PL" Asset Type, the date the product is planned for introduction into manufacturing. This differs from the Projected Date as lead-time is normally needed to make a product. |
| OTHER | Other fields per user requirements. |

Next, in step 150, records from planned inventory requisition file 115 having P/Ns and Plants the same as the P/Ns and Plants in the records selected from the current version of requisition map file 125 are selected.

In step 155, the records selected from planned asset file 145 in step 140 and the records selected from planned inventory requisition file 115 in step 150 are mapped into a coverage 1 file 160A or a coverage 2 file 160B. The fields of each record and a description of those fields of coverage 1 file 160A and coverage 2 file 160B are described in table VI infra and an example file is illustrated in FIG. 3E.

1 file 160A or coverage 2 file 160B may read the Requisition Type field to determine what methodology or process to apply.

Coverage 1 file 160A and coverage 2 file 160B are generated as follows: (1) from records selected from planned asset file 145, copy fields Part Number, Plant, Asset Type, Asset Identifier and Planned Inventory Requisition Reference, into corresponding fields of appropriate coverage 1 file 160A or coverage 2 file 160B as described supra; (2) from records selected from planned inventory requisition file 115 copy fields Requisition Type and Requisition Identifier into corre-

TABLE VI

| | |
|---|---|
| COVERAGE 1 AND COVERAGE 2 FILES | A mapping of associating planned assets (from planned asset file 145) with planned inventory requisitions (from planned inventory requisition file 115). These consist of two intermediate files with the same data elements. The file called coverage 1 associates planned assets with planned inventory requisitions of type "CSHP" (customer shipment) and "COMP" (component for a subsequent assembly-"). Coverage 2 associates planned assets with planned inventory requisitions of all others types. |
| Part Number | A unique product identifier (from planned inventory requisition file 115 or from planned asset file 145). |
| Plant | A location descriptor indicating where inventory will be consumed (from planned inventory requisition file 115 or from planned asset file 145). |
| Asset Type | Type of asset being consumed by the specific planned inventory requisition (from planned asset file 145). |
| Asset Identifier | A unique code identifying this specific planned asset (from planned asset file 145). |
| Planned Inventory Requisition Reference | References corresponding planned asset records for interplant shipment and substitution asset types (from planned inventory requisition file 115 Planned Asset Reference field and from planned asset file 145 Planned Requisition Reference). |
| Requisition Type | Type of requisition that is consuming the asset (from planned inventory requisition file 115). |
| Requisition Identifier | A unique code identifying this specific planned inventory requisition (from planned inventory requisition file 115). |
| Quantity | Quantity of asset, which will be consumed for this specific requisition (calculated from field Projected Quantity of planned asset file 145). |
| Asset Availability Date | Date when the asset was available for consumption (might have been earlier than when it is planned for consumption; from Projected Date field of planned asset file 145). |
| Requisition Date | Date when asset will be consumed by this specific requisition (from planned inventory requisition file 115). |
| Start Date | If Asset Type is planned manufacturing release ("PL"), this field reflects the start date for the release (from planned asset file 145). |
| Start Quantity | For a "PL" Asset Type (i.e., planned manufacturing release), the quantity of product that is planned for introduction into manufacturing corresponding to the Quantity field above. This differs from Quantity reflecting yield loss, which occurs during manufacturing processing. |
| OTHER | Other fields per user requirements. |

The difference between coverage 1 file 160A and coverage 2 file 160B is coverage 1 file is based on Requisition Type field "CSHP" or "COMP" records while coverage 2 file includes all other Requisition Type field records. Alternatively, coverage 1 file 160A and coverage 2 file 160B may be a single file with an indicator field or steps that use coverage sponding fields of appropriate coverage 1 file 160A or coverage 2 file 160B as described supra; and (3) calculate the Quantity field by disaggregating the Projected Quantity field of planned asset file 145 and the Quantity field of planned inventory requisition file 115 (see FIGS. 3A, 3D and 3E for examples).

In step 165, all records in requisition map file 125 whose part numbers correspond to the current LLC are selected and either held in memory, held in a temporary file or a pointer file generated for locating these selected records in the current version of requisition map file 125. The method now proceeds through connector "A" to step 170 of FIG. 1B.

Turning to FIG. 1B, in step 170, the records of coverage 1 file 160A and requisition map file 125 (through any of the methods described in step 165 supra) are mapped into a demand pegging output file 175. Demand pegging output file 175 is the final result of the method of the present invention, but is not complete until all LLC loops as described infra are completed. This is a process that disaggregates so that planned asset quantities covering specific portions of customer demands are calculated and outputted to the demand pegging output file 175. Note that the processing done in step 110 supra and in steps 215 and 230 infra guarantees that there will be requisition map information for requisition types customer shipments (coming from step 110) and components for assemblies (coming from steps 215 and 230). Therefore, by quantity, the total quantities for each requisition identifier in coverage 1 file 160A must necessarily match the total quantities in requisition map file 125.

The fields of each record and a description of those fields of demand pegging output file 175 are described in table VII infra and an example file is illustrated in FIG. 3F.

Records for demand pegging file 175 from coverage 1 file 160A are generated as follows: (1) copy fields as indicated in TABLE VII into a new demand pegging output file 175 record(s); (2) calculate the Quantity field of the new demand pegging output file 175 record(s) by disaggregating the corresponding Quantity field of coverage 1 file 160A against all demands for each P/N; (3) calculate the Start Quantity field by disaggregating corresponding Start Quantity field of coverage 1 file 160A against all demands for each P/N; and (4) calculate the Customer Demand Quantity field by disaggregating corresponding Customer Demand Quantity field of requisition map file 125.

For example, the Quantity field of the first record of the Example Coverage 1 File 160A and Coverage 2 File 160B of FIG. 3E is 100 (of PN1) and shows up disaggregated in the Quantity field of the first and second records of the Example Demand Pegging Output File of FIG. 3F (50 each).

Returning to FIG. 1B, in step 180 a process similar to that performed in step 170 is performed except planned assets in coverage 2 file 160B are mapped against customer demands in requisition map file 125. Note that step 180 is required only when the Asset Type field of records for demand pegging output file 175 generated in step 170 is "SUB" or "INTRECPT." As the requisition map file 125 does not have entries for inventory requisitions to satisfy asset types of substitutions ("SUB") and interplant shipments ("IN-

TABLE VII

| | |
|---|---|
| DEMAND PEGGING OUTPUT FILE | File which associates elements of the planned asset file 145 with planned inventory requisition data elements from planned inventory requisition file 115 and with customer demand records from customer demand file 120 via coverage 1 file 160A and coverage 2 file 160B. The net result is that planned assets are associated with customer demands no matter where in the supply chain the assets reside. |
| Part Number | A unique product identifier (from coverage 1 file 160A or coverage 2 file 160B) |
| Plant | A location descriptor indicating where inventory will be created (originally from planned asset file 145) |
| Asset Type | A code indicating the form of the present or planned asset (originally from planned asset file 145). |
| Asset Availability Date | Date when the asset was available for consumption (might have been earlier than when it is planned for consumption) (originally from planned asset file 145) |
| Start Date | If Asset Type is a planned manufacturing release ("PL"), this field reflects the start date for the release. This differs from the Asset Availability Date as lead-time is normally needed to make a product. (originally from planned asset file 145) |
| Asset Identifier | A unique code identifying this particular actual or planned asset (originally from planned asset file 145) |
| Requisition Type | Type of requisition that is consuming the asset (originally from planned inventory requisition file 115) for the specific end customer demand. |
| Requisition Identifier | A unique code identifying this specific inventory requisition that is consuming the asset (originally from planned inventory requisition file 115) for the specific end customer demand below. |
| Quantity | Quantity of asset, which will be consumed for this specific inventory requisition for this specific end demand. (Calculated) |
| Start Quantity | Quantity to release into manufacturing corresponding to the Quantity field if this is for an Asset Type representing a manufacturing release. (Calculated) |
| Customer Part Number | The part number being ordered or forecast by the customer. (originally from customer demand file 120) |
| Customer Code | A code identifying the customer requesting the product (originally from customer demand file 120). |
| Order Number | A unique identifier associated with this particular demand record (originally from customer demand file 120). |
| Customer Demand Quantity | Portion of the customer demand quantity covered by this record. (Calculated) |
| OTHER | Other fields per user requirements. |

TRECPT"), additional processing beyond simple matching is required to associate planned assets in coverage 2 file 160B with customer demands in requisition map file 125. This is accomplished as follows. Requisitions in coverage 2 file 160B for interplant shipments and substitutions must have corresponding planned assets in coverage 1 file 160A. Therefore, a mapping process is performed to find the records in coverage 2 file 160B corresponding to "SUB" and "INTRECPT" records in coverage 1 file 160A. This would associate planned assets in coverage 2 file 160B with customer demands in requisition map file 125 and generate new demand pegging records. If the associated planned assets are not of Asset Type "INV," "WIP" or "PL", a similar process will be performed to locate new records in coverage 2 file 160B that have corresponding inventory requisitions. This looping process is repeated until the Asset Type is either "INV," "WIP" or "INTRECPT".

Next in step 185, a decision is made based on the Asset Type field of each record in demand pegging output file 175. For records with asset type "PL" the method proceeds to step 195 of FIG. 1C via connector "B"; for all other asset types in step 190 no further processing of records is required.

Turning to FIG. 1C, in step 195 records in demand pegging output file 175 are filtered so only records for Asset Type="PL" are selected. Then in step 200, a union of the records selected in step 195 and corresponding records in a bill of material file (BOM) 205 are created and stored in a temporary file 210. The fields of each record and a description of those fields of bill of material file 205 are described in table VIII infra. Examples of temporary file 210 and of bill of material file 205 are illustrated in FIGS. 3I and 3G, respectively.

TABLE VIII

| | |
|---|---|
| BILL OF MATERIAL FILE | A bill of material provides a list of component parts and quantities necessary to build a P/N which represents an assembly of the components. |
| Part Number | A unique product identifier. |
| Plant | The location at which Part Number above will be built. |
| Process | The particular process that will be used to build the Part Number at the above plant. |
| Component Part Number | A required component P/N. |
| Component Quantity | A quantity indicating the number of this component required for each assembly part being built. |
| Binning Flag | Indicates whether the above Part Number results from a binning process. |
| OTHER | Other fields per user requirements. |

Records in temporary file 210 are generated as follows: (1) for each P/N in records filtered from demand pegging output file 175; (2) find same P/N in bill of material file 205; and (3) add Component Part Number, Component Quantity and Binning Flag fields from bill of material file 205 to filtered demand pegging records and write as record to temporary file 210; if a P/N has multiple component P/Ns, write a record for each component P/N.

For example, filtering on the Example Demand Pegging Output File of FIG. 3F would select the last three records (those with Asset Type="PL"). The Component P/N, BOM Quantity and BIN Flag fields from P/Ns PN3, PN6 and PN7 in Example Bill Of Material File of FIG. 3G are then added to the three selected demand pegging records to generate the Example Temporary File of FIG. 3I. Because the PN3 record in FIG. 3G had two component P/Ns (PN4 and PN5), there are two PN3 records in FIG. 3I.

Returning to FIG. 1C, in step 215 new requisition map file 125 records are created for each record in temporary file 210 as follows: (1) for each record in temporary file 210 copy the following fields to the corresponding fields in requisition map file 125 to create a new record in requisition map file 125: Component P/N to Part Number, Asset Identifier to Requisition Identifier, Part Number to Reference and Start Date to Requisition Date (other fields map with the same field name in both files); and (2) calculate the Consumption Quantity field of the new requisition map file 125 record by multiplying the Start Quantity field of temporary file 210 by the BOM Quantity field of temporary file 210.

For example, turning to FIG. 3J, the last four records of the Example Requisition Map File (After Step 215) were generated from the four records of the Example Temporary File of FIG. 3I. The records are in the same order in both files.

Returning to FIG. 1C, in step 225, for each record added to requisition map file 125 in step 215, the value of the BIN Flag field is determined. If the BIN Flag="N", no further processing is required. However, if the BIN Flag="Y", then in step 230, additional records are added to requisition map file 125 to account for any "unused" portion of the binned P/N(s). Step 230 is more fully illustrated in FIG. 4 and described infra.

While steps 200 and 215 have been described using temporary file 210, the invention may be practiced without using a temporary file. This is done by gathering the information indicated and operating on it directly to produce new records or adjust existing records in requisition map file 125.

Figure 4:
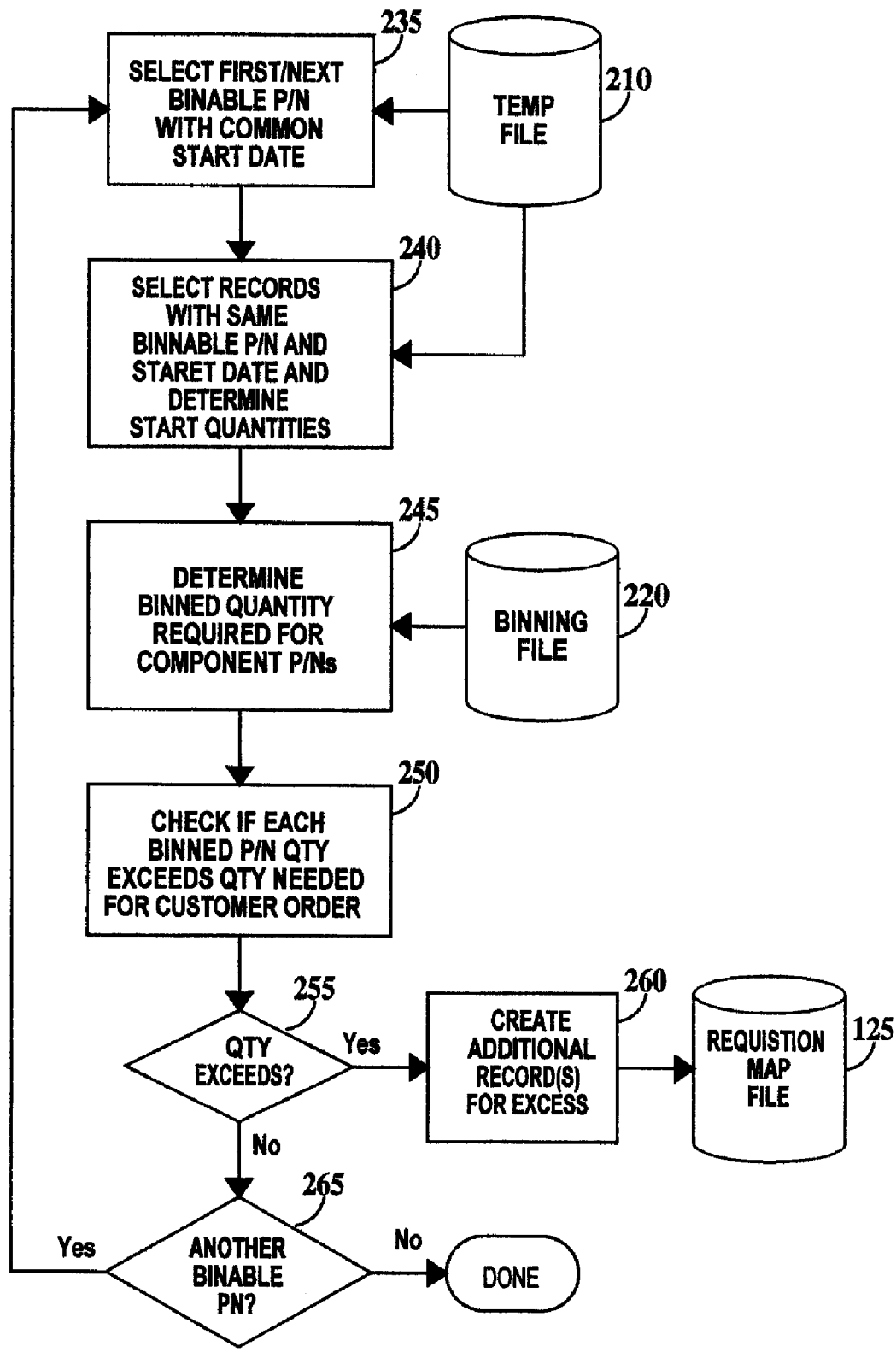
FIG. 4 is a flowchart of sub-steps for the pegging with binning step of the flowchart of FIG. 1C according to the present invention.

After steps 225 and 230 are completed the method returns to step 130 of FIG. 1A via connector "C." FIG. 4 is a flowchart of sub-steps of step 230 of FIG. 1C. In step 235, from temporary file 210, the first/next binable P/N (i.e., component P/N) is selected and the Start Date field is determined. In step 240, again from temporary file 210, all the records that have the same binable P/N and Start Date are selected and each Start Quantity is determined. For example, in FIG. 3I, the last two records in which Component P/N="PN8" and Start Date="Mar. 1, 2004" are selected and the Start Quantity of PN6=50 and of PN7=30.

In step 245, the (minimum) quantity required by the binable P/N in order to make all the starts is determined. This is accomplished by taking the maximum of each Start Quantity divided by the Binning Percentage for each binned P/N from binning file 220. Continuing the example of FIG. 3I, from FIG. 3H it can be found that PN6 has a binning percentage of 70% of PN8 and PN7 has a binning percentage of 30% of PN8. Therefore the maximum of 50/0.7 and 30/0.3 is determined, which is 100. Thus 100 parts of PN8 must be started which will give 70 pieces of PN6 and 30 pieces of PN7.

In step 250, it is checked if any binned quantity exceeds the amount needed for the customer order. Continuing the example of FIG. 3I, for PN8/PN6 only 50 are needed but 70 are available, so there is an excess of 20 pieces. For PN8/PN7 30 parts are needed and 30 are available. Note, the case of there not being enough parts to satisfy the start for a binned part is not possible because the PSR generated a feasible plan, that is, a plan that supplied sufficient parts on given dates as reflected in planned inventory requisition file 115 described supra.

In step 255, if a binned quantity of a P/N exceeds that required, then in step 260 an additional record is created and added to requisition map file 125; otherwise in step 265 the method loops to step 235 or is done. In step 260 a record for the excess quantity is created. This may be seen in the last record of the Example Requisition Map File of FIG. 3K. The last record is identical to the third record from the bottom except for the Consumption Quantity and Customer Code fields.

FIGS. 5A and 5B illustrate pegging with binning according to the present invention and are self explanatory, describing pegging with binning a slightly different way. FIG. 5A indicates inputs and outputs required and FIG. 5B describes the method.

Figure 6:
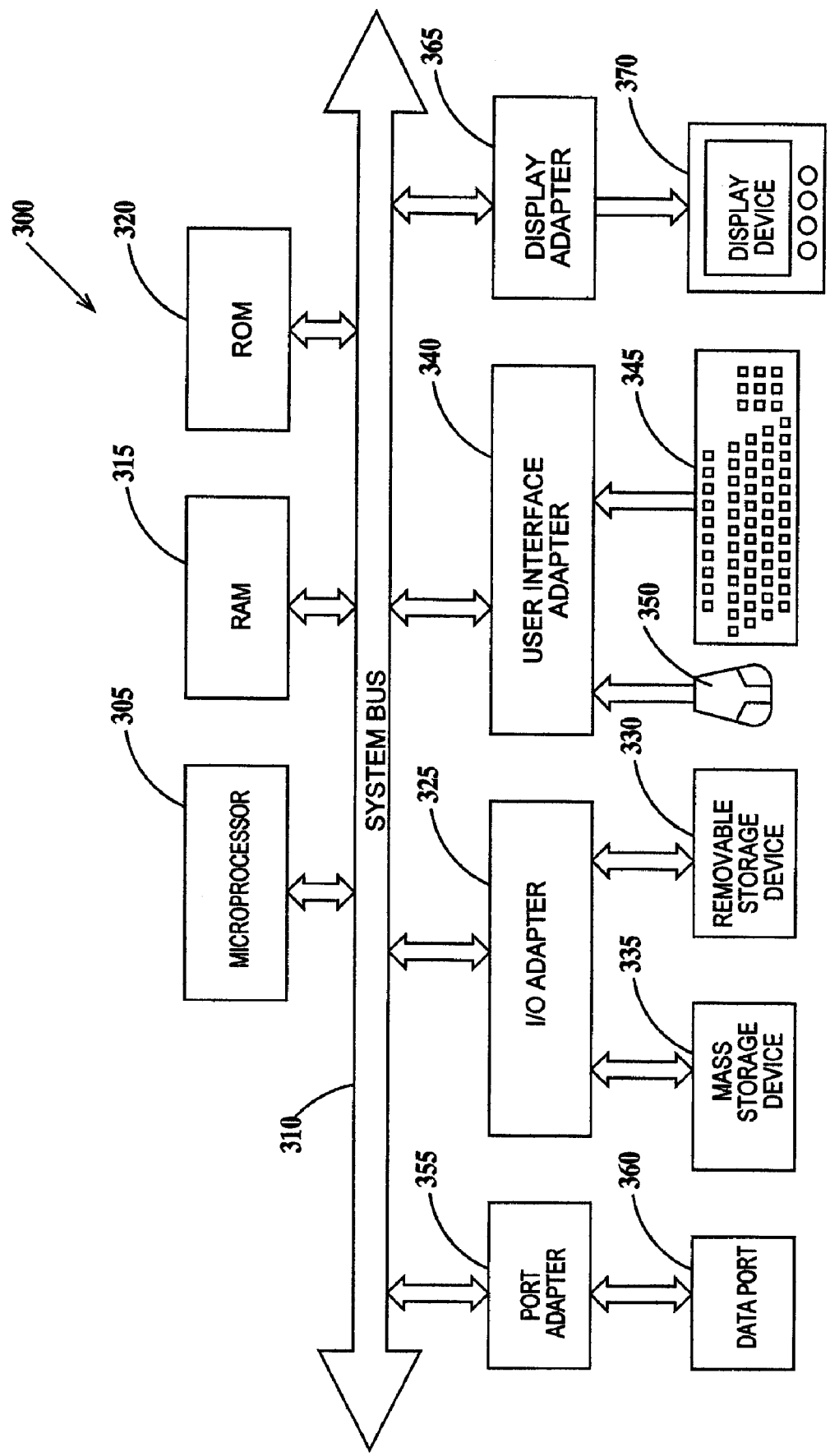
FIG. 6 is a schematic block diagram of a general-purpose computer for practicing the present invention.

Generally, the method described herein with respect to identifying production assets in a supply chain to satisfy multiple customer demands is practiced with a general-purpose computer and the method may be coded as a set of instructions on removable or hard media for use by the general-purpose computer. FIG. 6 is a schematic block diagram of a general-purpose computer for practicing the present invention. In FIG. 6, computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 330, fed through data port 360 or typed in using keyboard 345.

Thus, the present invention provides a method and system for generating relationships between supply chain assets in a complex multi-stage, multi-part number, and multi-plant manufacturing environment and multiple customer demands such that the generated relationships are consistent with planned production schedules for the manufacturing environment.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, the method and system described herein are not limited to any particular type of product, such as semiconductors, but may be used in for tracking component assets of any complex product in any complex manufacturing environment. A complex manufacturing environment defined as an environment fulfilling at least one of the following criteria: multiple P/Ns, multiple components for each P/N, multiple levels or steps of fabrication, multiple plants or venders, multiple customers, allowing substitution of assets or allowing interplant shipment of assets. Therefore, it is intended that the following claims cover all such modifications and changes as fall within the true spirit and scope of the invention.

The invention claimed is:

1. A method for identifying product assets in a supply chain used to satisfy customer demands, comprising:
   (a) receiving a customer demand schedule for delivery of products;
   (b) receiving a planned inventory requisition schedule of all components to be assembled into said products, said planned inventory requisition schedule generated from said customer demand schedule by a production scheduling run;
   (c) receiving bills of materials listing all components required for each of said products;
   after (a), (b) and (c), (d) generating, by a processor of a computer system, first and second coverage files from said planned inventory schedule, from said customer demand schedule and from said bills of materials, said first coverage file containing a list of assets including products to be used for product shipments and components to be assembled into products to meet product shipment demands, said second coverage file containing a list of all other assets; and
   after (d), (e) generating, by said processor of said computer system, from said first and second coverage files, a set of demand pegging records, said demand pegging records associating a quantity and an availability date of each component of each product with a required quantity of each of said products, each demand pegging record consistent with said planned inventory requisition schedule.

2. The method of claim 1, wherein at least some of said components may be assembled from other of said components.

3. The method of claim 1, wherein at least some of said components are common to one or more of said products.

4. The method of claim 1, wherein at least some of said components are binned components that are sorted to different specifications from a common component.

5. The method of claim 4, further including:
   generating, by said processor of said computer system, additional demand pegging records for unused binned components that are available in quantities in excess of those required for assembly of said products.

6. The method of claim 1, further including:
   each component and product listed in said bills of materials having a low-level-code indicating a sequence in which said components are assembled into said products, completed products having a lowest level code and starting component of a completed product having a highest low level code; and
   repeating (d) and (e) one low level code at a time in sequence from a lowest low-level-code to a highest low level.

7. The method of claim 1, wherein said inventory requisition schedule includes one or more schedules selected from the group consisting of schedules for components from multiple sources, schedules for substitute components for at least some of said components, schedules for inter-source shipments of at least some components and schedules for sorted components that are that are sorted into two or more different part-numbers.

8. A method for identifying product assets in a supply chain used to satisfy customer demands, comprising:
   (a) selecting, by a processor of a computer system, all records from said requisition map file of components and products having low-level codes equal to a current low-level-code from a bill of material listing all components required for products, each component and product having a low-level-code indicating a sequence in which said components are assembled into said products and each product and component having a unique part-number;

after (a), (b) mapping, by said processor of said computer system, a planned inventory requisition file comprising component availability schedules and a customer demand file comprising product shipment schedules for said products assembled from said components into a requisition map file associating said component availability schedules and said product shipment schedules and including quantities of each component to be used for each product;

after (b), (c) selecting, by said processor of said computer system, from a planned asset file comprising component schedules, records having part numbers equal to the part numbers of records selected in (a);

after (c), (d) selecting, by said processor of said computer system, from said planned inventory requisition file, records having part numbers equal to the part numbers in the records selected in (a);

after (d), (e) mapping, by said processor of said computer system, records selected in steps (c) and (d) into a coverage file associating component availability with component requirements for each product;

after (d), (f) mapping, by said processor of said computer system, said coverage file and records of corresponding part numbers from said requisition map file into a demand pegging output file comprising demand pegging output records, said demand pegging records associating a quantity and an availability date of each component required to produce a required quantity of each of said products, each demand pegging record consistent with a feasible schedule;

after (f), (g) generating, by said processor of said computer system, additional records in said requisition map file for components required to fabricate products whose records were mapped into said demand pegging output file in (f); and after (g), (h) incrementing, by said processor of said computer system, the current low-level-code and repeating steps (b) through (h) until the current low-level code is higher than a highest low-level-code of any said component or said product.

9. The method of claim 8, wherein said planned inventory requisition file and said planned asset file are generated, by said processor of said computer system, by a production-scheduling run using said customer demand file as an input to said production-scheduling run and said planned inventory requisition file and said planned asset file comprise feasible schedules.

10. The method of claim 9, wherein said planned inventory requisition file and said planned asset file include one or more schedules independently selected from the group consisting of schedules for components from multiple sources, schedules for substitute components for at least some of said components, schedules for inter-source shipments of at least some components and schedules for sorted components that are that are sorted into two or more different part-numbers.

11. The method of claim 8, wherein step (g) includes:
(i) selecting, by said processor of said computer system, from said demand pegging output file all records of components having a planned release into manufacturing date later than a date that said planned inventory requisition file was generated;

(ii) mapping, by said processor of said computer system, records selected in (i) to a bill of materials listing all components required for a particular product; and (iii) generating, by said processor of said computer system, additional records in said requisition mapping file for components required to fabricate components whose records were selected in (i).

12. The method of claim 11, further including:
(iv) selecting, by said processor of said computer system, all records generated in (iii) that are for binned components, a binned component defined as a component derived from a common component by sorting said common component to two or more different specifications; and (v) adding, by said processor of said computer system, an additional record to said requisition map file for each unused quantity of each binned component available in excess of a quantity required for assembly of quantities of products using said binned components.

13. The method of claim 12, further including:
calculating, by said processor of said computer system, the quantity of each common component required by taking the maximum of the quantity required of each binned component divided by a sort percentage for each binned component sorted from said common component.

14. The method of claim 8, further including, wherein (a) further includes:
generating and assigning, by said processor of said computer system, said low-level-codes to each component and product.

15. A computer system comprising a processor, an address/data bus coupled to said processor, and a computer-readable memory unit adapted to be coupled to said processor, said memory unit containing instructions that when executed by said processor implement a method for identifying product assets in a supply chain used to satisfy customer demands, said method comprising the computer implemented steps of:

(a) receiving a customer demand schedule for delivery of products;

(b) receiving a planned inventory requisition schedule of all components to be assembled into said products, said planned inventory requisition schedule generated from said customer demand schedule by a production scheduling run;

(c) receiving customer bills of materials listing all components required for each of said products;

after (a), (b) and (c), (d) generating first and second coverage files from said planned inventory schedule, from said customer demand schedule and from said bills of materials, said first coverage file containing a list of assets including products to be used for product shipments and components to assembled into products to meet product shipment demands, said second coverage file containing a list of all other assets; and after (d), (e) generating from said first and second coverage files, a set of demand pegging records, said demand pegging records associating a quantity and an availability date of each component of each product with a required quantity of each of said products, each demand pegging record consistent with said planned inventory requisition schedule.

16. The system of claim 15, wherein at least some of said components may be assembled from other of said components.

17. The system of claim 15, wherein at least some of said components are common to one or more of said products.

18. The system of claim 15, wherein at least some of said components are binned components that are sorted to different specifications from a common component.

19. The system of claim 18, further including:
generating additional demand pegging records for unused binned components that are available in quantities in excess of those required for assembly of said products.

20. The system of claim 15, further including:
each component and product listed in said bills of materials having a low-level-code indicating a sequence in which said components are assembled into said products, completed products having a lowest level code and starting component of a completed product having a highest low level code; and
repeating steps (d) and (e) one low level code at a time in sequence from a lowest low-level-code to a highest low level.

21. The system of claim 15, wherein said inventory requisition schedule includes one or more schedules selected from the group consisting of schedules for components from multiple sources, schedules for substitute components for at least some of said components, schedules for inter-source shipments of at least some components and schedules for sorted components that are that are sorted into two or more different part-numbers.

22. A computer system comprising a processor, an address/data bus coupled to said processor, and a computer-readable memory unit adapted to be coupled to said processor, said memory unit containing instructions that when executed by said processor implement a method for identifying product assets in a supply chain used to satisfy customer demands, said method comprising the computer implemented steps of:
(a) selecting all records from said requisition map file of components and products having low-level codes equal to a current low-level-code from a bill of material listing all components required for products, each component and product having a low-level-code indicating a sequence in which said components are assembled into said products and each product and component having a unique part-number;
after (a), (b) mapping a planned inventory requisition file comprising component availability schedules and a customer demand file comprising product shipment schedules for said products assembled from said components into a requisition map file associating said component availability schedules and said product shipment schedules and including quantities of each component to be used for each product;
after (b), (c) selecting, from a planned asset file comprising component schedules, records having part numbers equal to the part numbers of records selected in (a);
after (c), (d) selecting, from said planned inventory requisition file, records having part numbers equal to the part numbers in the records selected in (a);
after (d), (e) mapping records selected in steps (c) and (d) into a coverage file associating component availability with component requirements for each product;
after (d), (f) mapping said coverage file and records of corresponding part numbers from said requisition map file into a demand pegging output file comprising demand pegging output records, said demand pegging records associating a quantity and an availability date of each component required to produce a required quantity of each of said products, each demand pegging record consistent with a feasible schedule;
after (f), (g) generating additional records in said requisition map file for components required to fabricate products whose records were mapped into said demand pegging output file in (f); and
after (g), (h) incrementing the current low-level-code and repeating steps (b) through (h) until the current low-level code is higher than a highest low-level-code of any said component or said product.

23. The system of claim 22, wherein said planned inventory requisition file and said planned asset file are generated by a production-scheduling run using said customer demand file as an input to said production-scheduling run and said planned inventory requisition file and said planned asset file comprise feasible schedules.

24. The system of claim 23, wherein said planned inventory requisition file and said planned asset file include one or more schedules independently selected from the group consisting of schedules for components from multiple sources, schedules for substitute components for at least some of said components, schedules for inter-source shipments of at least some components and schedules for sorted components that are that are sorted into two or more different part-numbers.

25. The system of claim 22, wherein (g) includes:
(i) selecting from said demand pegging output file all records of components having a planned release into manufacturing at a date later than a date that said planned inventory requisition file was generated;
(ii) mapping records selected in (i) to a bill of materials listing all components required for a particular product; and
(iii) generating additional records in said requisition mapping file for components required to fabricate components whose records were selected in (i).

26. The system of claim 25, further including:
(iv) selecting all records generated in (iii) that are for binned components, a binned component defined as a component derived from a common component by sorting said common component to two or more different specifications; and
(v) adding an additional record to said requisition map file for each unused quantity of each binned component available in excess of a quantity required for assembly of quantities of products using said binned components.

27. The system of claim 26, further including:
calculating the quantity of each common component required by taking the maximum of the quantity required of each binned component divided by a sort percentage for each binned component sorted from said common component.

28. The system of claim 22, further including, wherein step (a) further includes:
generating and assigning said low-level-codes to each component and product.

29. A program storage device readable by machine, tangibly embodying a program of instructions executable by the machine to perform method steps for identifying product assets in a supply chain used to satisfy customer demands said method steps comprising:
(a) receiving a customer demand schedule for delivery of products;
(b) receiving a planned inventory requisition schedule of all components to be assembled into said products, said planned inventory requisition schedule generated from said customer demand schedule by a production scheduling run;
(c) receiving bills of materials listing all components required for each of said products, each component and product having a low-level-code indicating a sequence in which said components are assembled into said products and each product and component having a unique part-number;

after (a), (b) and (c), (d) generating first and second coverage files from said planned inventory schedule, from said customer demand schedule and from said bills of materials, said first coverage file containing a list of assets including products to be used for product shipments and components to be assembled into products to meet product shipment demands, said second coverage file containing a list of all other assets; and after (d), (e) generating from said first and second coverage files, a set of demand pegging records, said demand pegging records associating a quantity and an availability date of each component of each product with a required quantity of each of said products, each demand pegging record consistent with said planned inventory requisition schedule.

30. A program storage device readable by machine, tangibly embodying a program of instructions executable by the machine to perform method steps for identifying product assets in a supply chain used to satisfy customer demands said method steps comprising:
 (a) selecting all records from said requisition map file of components and products having low-level codes equal to a current low-level-code from a bill of material listing all components required for products, each component and product having a low-level-code indicating a sequence in which said components are assembled into said products and each product and component having a unique part-number;
 (a), (b) mapping a planned inventory requisition file comprising component availability schedules and a customer demand file comprising product shipment schedules for said products assembled from said components into a requisition map file associating said component availability schedules and said product shipment schedules and including quantities of each component to be used for each product;
 after (b), (c) selecting, from a planned asset file comprising component schedules, records having part numbers equal to the part numbers of records selected in (a);
 after (c), (d) selecting, from said planned inventory requisition file, records having part numbers equal to the part numbers in the records selected in (a);
 after (d), (e) mapping records selected in steps (c) and (d) into a coverage file associating component availability with component requirements for each product;
 after (d), (f) mapping said coverage file and records of corresponding part numbers from said requisition map file into a demand pegging output file comprising demand pegging output records, said demand pegging records associating a quantity and an availability date of each component required to produce a required quantity of each of said products, each demand pegging record consistent with a feasible schedule;
 after (f), (g) generating additional records in said requisition map file for components required to fabricate products whose records were mapped into said demand pegging output file in (f); and
 after (g), (h) incrementing the current low-level-code and repeating steps (b) through (h) until the current low-level code is higher than a highest low-level-code of any said component or said product.

31. The method of claim 1, wherein said all other assets include components available in inventory, components currently being manufactured, components planned to be released to manufacturing, components that can be substituted for required components and components that can be obtained from another plant.

32. The method of claim 1, (d) further including:
generating, by said processor of said computer system, a planned asset file from said production scheduling run; and
said generating by said processor of said computer system, said first and second coverage files includes:
 copying, by said processor of said computer system, Part Number, Plant, Asset Type, Asset Identifier and Planned Inventory Requisition Reference fields from said planned asset file into corresponding fields of said first and second coverage files;
 copying, by said processor of said computer system, Requisition Type and Requisition Identifier fields from said inventory schedule into corresponding fields said first and second coverage files; and
 calculating, by said processor of said computer system, a Quantity field of said first and second coverage files by disaggregating Projected Quantity fields of said planned asset file and Quantity fields of inventory schedule.

33. The system of claim 15, wherein said all other assets include components available in inventory, components currently being manufactured, components planned to be released to manufacturing, components that can be substituted for required components and components that can be obtained from another plant.

34. The system of claim 15, (d) further including:
generating a planned asset file from said production scheduling run; and
said generating said first and second coverage files includes:
 copying Part Number, Plant, Asset Type, Asset Identifier and Planned Inventory Requisition Reference fields from said planned asset file into corresponding fields of said first and second coverage files;
 copying Requisition Type and Requisition Identifier fields from said inventory schedule into corresponding fields said first and second coverage files; and
 calculating a Quantity field of said first and second coverage files by disaggregating Projected Quantity fields of said planned asset file and Quantity fields of inventory schedule.

35. The method of claim 8, (e) further including:
copying, by said processor of said computer system, Part Number, Plant, Asset Type, Asset Identifier and Planned Inventory Requisition Reference fields from said planned asset file into corresponding fields of said first and second coverage files;
copying, by said processor of said computer system, Requisition Type and Requisition Identifier fields from said inventory schedule into corresponding fields said first and second coverage files; and
calculating, by said processor of said computer system, a Quantity field of said first and second coverage files by disaggregating Projected Quantity fields of said planned asset file and Quantity fields of inventory schedule.

36. The method of claim 8, (b) further including:
 (i) copying, by said processor of said computer system, from said planned inventory requisition file, customer ship records fields Part Number, Plant, Requisition Type, Requisition Identifier, Date and Customer Code into corresponding fields of records in said requisition map file;

(ii) finding, by said processor of said computer system, from said customer demand file all records having Part Number and Customer Code corresponding to those in (i) and copying fields Customer Part Number and Order Number into corresponding fields of records in said requisition map file (iii) calculating, by said processor of said computer system, a Consumption Quantity field of said requisition map file by disaggregating the Quantity field of said planned inventory requisition file against all demands for each P/N; and (iii) calculating, by said processor of said computer system, a Customer Demand Quantity field of said requisition map file by disaggregating a Request Quantity field of said customer demand file.

37. The method of claim 8, (f) further including:

(i) calculating, by said processor of said computer system, the Quantity field of said demand pegging output file by disaggregating a corresponding Quantity field of said coverage against all demands for each product part number;

(ii) calculating, by said processor of said computer system, a Start Quantity field of said demand pegging output file by disaggregating a corresponding Start Quantity field of said coverage file against all demands for each product part number; and (iii) calculating, by said processor of said computer system, a Customer Demand Quantity field of said demand pegging file by disaggregating corresponding a Customer Demand Quantity field of said requisition map file.

38. The system of claim 22, (e) further including:

copying Part Number, Plant, Asset Type, Asset Identifier and Planned Inventory Requisition Reference fields from said planned asset file into corresponding fields of said first and second coverage files;

copying Requisition Type and Requisition Identifier fields from said inventory schedule into corresponding fields said first and second coverage files; and calculating a Quantity field of said first and second coverage files by disaggregating Projected Quantity fields of said planned asset file and Quantity fields of inventory schedule.

39. The system of claim 22, (b) further including:

(i) copying from said planned inventory requisition file, customer ship records fields Part Number, Plant, Requisition Type, Requisition Identifier, Date and Customer Code into corresponding fields of records in said requisition map file;

(ii) finding from said customer demand file all records having Part Number and Customer Code corresponding to those in (i) and copying fields Customer Part Number and Order Number into corresponding fields of records in said requisition map file (iii) calculating a Consumption Quantity field of said requisition map file by disaggregating the Quantity field of said planned inventory requisition file against all demands for each P/N; and (iii) calculating a Customer Demand Quantity field of said requisition map file by disaggregating a Request Quantity field of said customer demand file.

40. The system of claim 22, (f) further including:

(i) calculating the Quantity field of said demand pegging output file by disaggregating a corresponding Quantity field of said coverage against all demands for each product part number;

(ii) calculating a Start Quantity field of said demand pegging output file by disaggregating a corresponding Start Quantity field of said coverage file against all demands for each product part number; and (iii) calculating a Customer Demand Quantity field of said demand pegging file by disaggregating corresponding a Customer Demand Quantity field of said requisition map file.

* * * * *

UNITED STATES PATENT AND TRADEMARK OFFICE
CERTIFICATE OF CORRECTION

PATENT NO. : 7,606,743 B2  Page 1 of 1
APPLICATION NO. : 10/708119
DATED : October 20, 2009
INVENTOR(S) : Orzell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Twelfth Day of October, 2010

David J. Kappos
*Director of the United States Patent and Trademark Office*